A. H. SOUTHWICK,
N. LYON, assignee.
Heel Protector.
No. 9,539. Reissued Jan. 25, 1881.
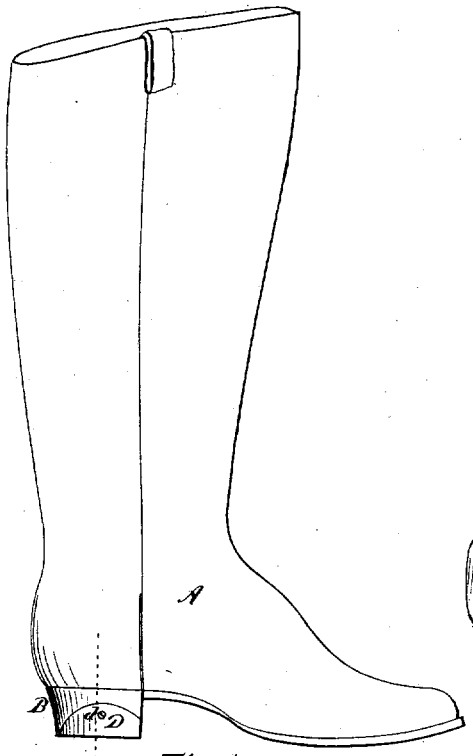
No. 1. Fig. 1.
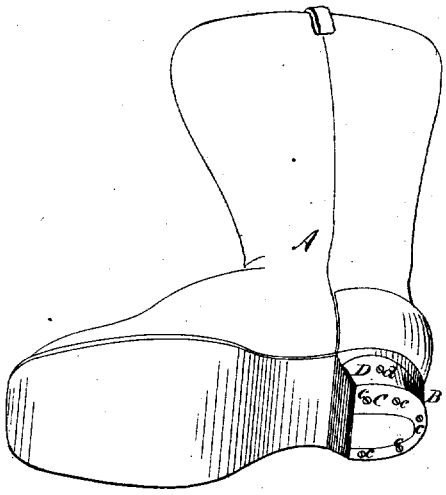
Fig. 2.
Fig. 3.
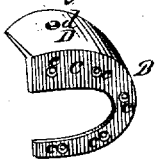
Witnesses: Charles Lockwood
Richard P. Dumany
Nelson Lyon
Assignee.
by his attorney
Alex. Selkirk
N. PETERS, PHOTO-LITHOGRAPHER, WASHINGTON, D. C.

UNITED STATES PATENT OFFICE.

NELSON LYON, OF ALBANY, NEW YORK, ASSIGNEE, BY MESNE ASSIGNMENTS, OF ALBERT H. SOUTHWICK.

HEEL-PROTECTOR.

SPECIFICATION forming part of Reissued Letters Patent No. 9,539, dated January 25, 1881.

Original No. 76,262, dated March 31, 1868. Application for reissue filed October 7, 1880.

*To all whom it may concern:*

Be it known that ALBERT H. SOUTHWICK, of St. Joseph, county of Buchanan, State of Missouri, (formerly of Mahaska county, State of Iowa,) invented certain Improvements in Devices for Keeping the Heels of Boots and Shoes Level, of which the following is a specification.

The invention consists of a device, which may be made of brass or any suitable metal, fitted to be attached to the heel of a boot or shoe to support the side of the heel and keep the heel in a normal position, and at the same time to prevent irregular wear of the under surface.

In the drawings, Figure 1 represents a side elevation of a boot with the heel-support attached; Fig. 2, a perspective view of the same. Fig. 3 represents the support detached.

In these figures the wearing-surface is represented at *b*. As represented, it consists of a rim fitted to the shape of the heel of the boot, and provided with a series of perforations, *c c*, for connecting it to said heel by means of screws or nails. The rim is shown in the figures as broader and thicker on one side than on the other, for the purpose of preventing irregular wear on that side.

A flange, D, is shown in the drawings extending upward and resting against the side of the heel, to which it is attached by means of a screw or nail. This flange is shaped to correspond with the heel of the boot B, and should extend upward far enough to stay the heel and keep it level, and also to prevent undue wear on that side. On that side, as represented, it extends about one-half or one-third way around the heel, but may be rounded, as shown more clearly in Fig. 1.

As will appear from Figs. 2, 3, and 4, the wider side of the bottom plate, which has the side support attached, widens the heel on that side, and thus re-enforces it at the point desired.

Having thus described the invention, what is claimed is—

1. A heel-protector consisting of a bottom wearing-plate provided with a side flange adapted to bear against the side of the heel, substantially as described.

2. In a heel-protector, the bottom plate, having one side made of greater width and thickness than the other, substantially as described.

3. A heel-plate composed of a bottom wearing-plate and a side flange, each provided with perforations for attachment to a boot or shoe heel, all substantially as set forth.

NELSON LYON.

Witnesses:
RICHARD P. DUMARY,
EDW. L. PEARSE.